United States Patent [19]
White

[11] Patent Number: 6,095,344
[45] Date of Patent: Aug. 1, 2000

[54] OVERHEAD STORAGE SYSTEM

[76] Inventor: Kenneth D. White, 6825 Cedar Ave., Cocoa, Fla. 32927

[21] Appl. No.: 09/003,952

[22] Filed: Jan. 7, 1998

[51] Int. Cl.[7] .................................. A47F 5/00; A47F 7/00
[52] U.S. Cl. .............................. 211/17; 211/21; 211/117; 211/118; 312/248; 312/319.2
[58] Field of Search ................................ 211/104, 18, 17, 211/19, 20, 22, 23, 24, 118, 117; 248/291.1, 292.11, 292.13, 284.1, 122.1, 324; 312/246, 247, 248, 319.2, 266

[56] References Cited

U.S. PATENT DOCUMENTS

| | | | |
|---|---|---|---|
| 557,567 | 4/1896 | Eddy | 211/17 |
| 580,032 | 4/1897 | Bierbach | 211/17 |
| 610,656 | 9/1898 | Martin | 211/18 |
| 614,503 | 11/1898 | Sackett | 211/18 |
| 618,999 | 2/1899 | Sayer | 211/17 |
| 1,232,501 | 7/1917 | Colen . | |
| 1,304,913 | 5/1919 | Shields | 211/113 X |
| 3,770,133 | 11/1973 | Kolker | 211/19 |
| 3,872,972 | 3/1975 | Cummins et al. | 211/17 |
| 3,883,002 | 5/1975 | Moore | 211/18 |
| 3,920,127 | 11/1975 | Labeaud | 211/118 |
| 3,976,200 | 8/1976 | Munns | 211/18 |
| 4,114,764 | 9/1978 | Rich | 211/100 |
| 4,116,341 | 9/1978 | Hebda | 211/17 |
| 4,221,353 | 9/1980 | Kuhn et al. | 248/292.11 X |
| 4,275,942 | 6/1981 | Steidl | 312/266 |
| 4,343,404 | 8/1982 | Folsom | 211/17 |
| 4,606,082 | 8/1986 | Kuhlman | 4/561 |
| 4,749,089 | 6/1988 | Stewart, III | 211/18 |
| 4,813,550 | 3/1989 | Saeks | 211/17 |
| 4,852,842 | 8/1989 | O'Neill | 248/284.1 X |
| 5,011,239 | 4/1991 | Guerin | 312/248 |
| 5,026,129 | 6/1991 | Merl | 312/266 |
| 5,083,729 | 1/1992 | Saeks et al. | 211/22 |
| 5,121,890 | 6/1992 | Komada | 248/122.1 |
| 5,183,162 | 2/1993 | Ritzenthaler | 211/1.57 |
| 5,221,009 | 6/1993 | Ritzenthaler | 211/18 |
| 5,257,767 | 11/1993 | McConnell | 248/284.1 X |
| 5,354,035 | 10/1994 | Helgren | 254/399 |
| 5,407,261 | 4/1995 | Mercer | 312/248 |
| 5,433,376 | 7/1995 | Kueshmer | 248/292.13 X |
| 5,456,529 | 10/1995 | Cheung | 312/248 X |

(List continued on next page.)

FOREIGN PATENT DOCUMENTS

| | | | |
|---|---|---|---|
| 2472503 | 12/1979 | France | 211/17 |
| 4209007A1 | 8/1993 | Germany | 211/18 |

*Primary Examiner*—Daniel P. Stodola
*Assistant Examiner*—Khoa Tran
*Attorney, Agent, or Firm*—Law Offices of Brian S. Steinberger

[57] ABSTRACT

An overhead storage system for bicycles and objects that weigh approximately 40 to 50 pounds. The stored object is counter balanced by nitrogen gas spring cylinders so as to make the object virtually weightless to the user-operator. The object is stored flat or horizontally against the ceiling of a garage, porch or breezeway so as to be well above headspace and so that floor space is not taken up by the object. The user-operator pulls the stored object down with a cord similar in ease to pulling down a set of attic type stairs. A boom is pivotally connected to a ceiling mount. A first gas spring allows the stored object to move and rotate in an arc from the horizontal ceiling adjacent position to a vertical position approximately thirty inches from the floor. The boom has a lower telescoping tubular sections with a second lower gas spring holding the tubular sections together. The user-operator pulls down on handles connected to the lower tubular section which lowers the object to the floor. A latch locks the system to a down load position. The user-operator can take the object off peg supports on the system to be used. To return the object to a stored position, the above steps are repeated in reverse order. The nitrogen gas spring that causes the boom to rotate about the ceiling mount pivot is a 200 lbs force spring, while the nitrogen gas spring inside the boom that lifts the bicycle in the vertical direction is an 80 to 100 lb force spring. The compound action of the pulley/cable arrangement inside the boom delivers a useable force to lift the bicycle of one half of the nitrogen spring force or about 40 to 50 lbs.

3 Claims, 9 Drawing Sheets

U.S. PATENT DOCUMENTS

| | | | |
|---|---|---|---|
| 5,460,274 | 10/1995 | Kramer | 211/17 |
| 5,474,189 | 12/1995 | Peterson | 211/18 |
| 5,567,028 | 10/1996 | Lutovsky et al. | 312/246 |
| 5,662,256 | 9/1997 | Bryan | 211/18 X |
| 5,664,687 | 9/1997 | Liatti | 248/292.11 X |
| 5,882,099 | 3/1999 | Salice | 312/328 |
| 5,904,411 | 5/1999 | Hayakawa | 312/319.2 |

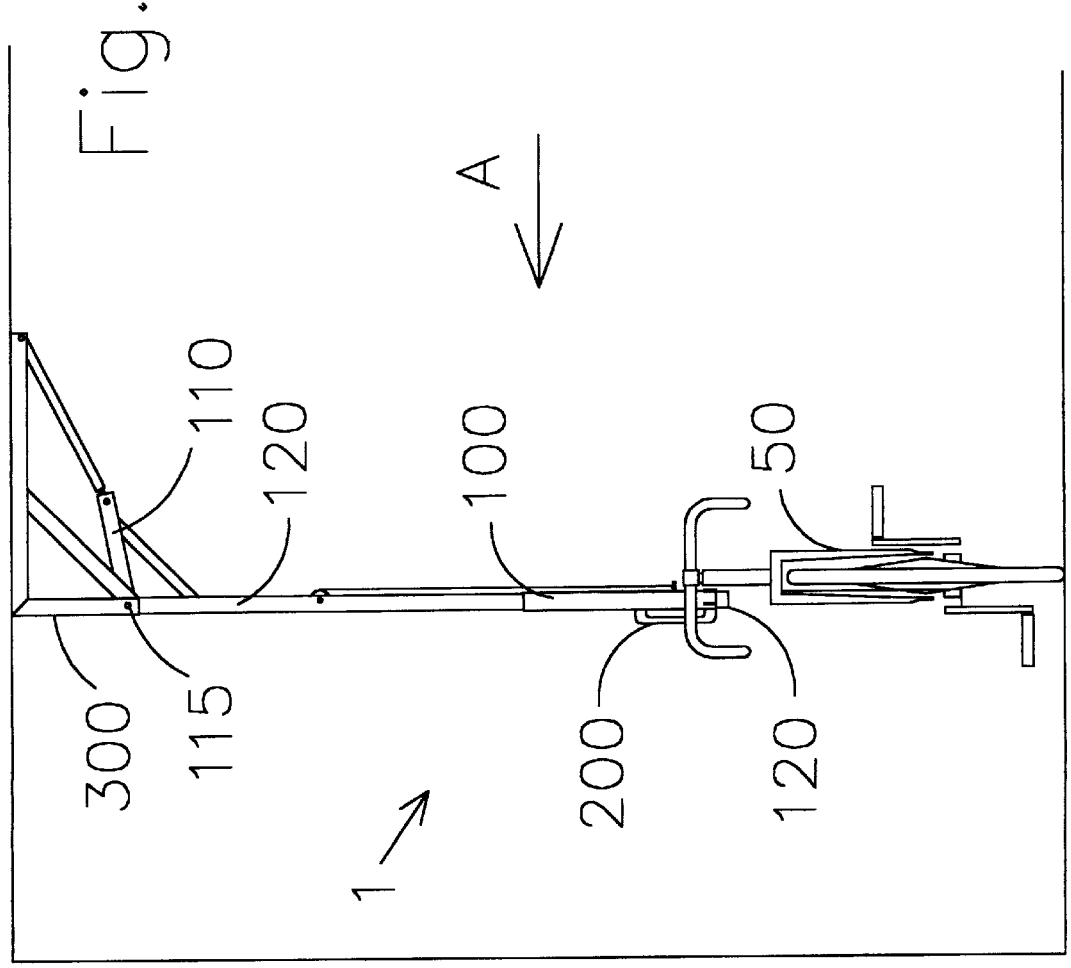

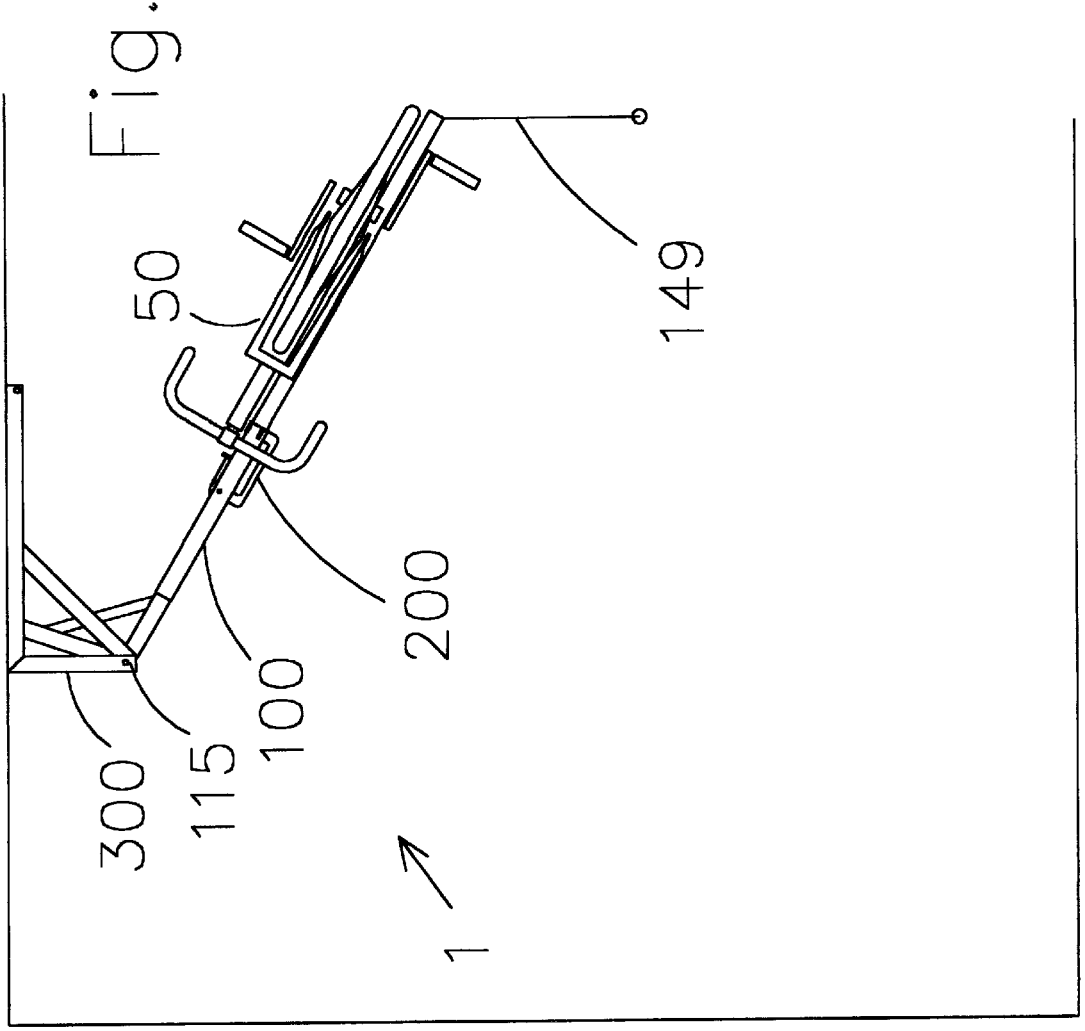

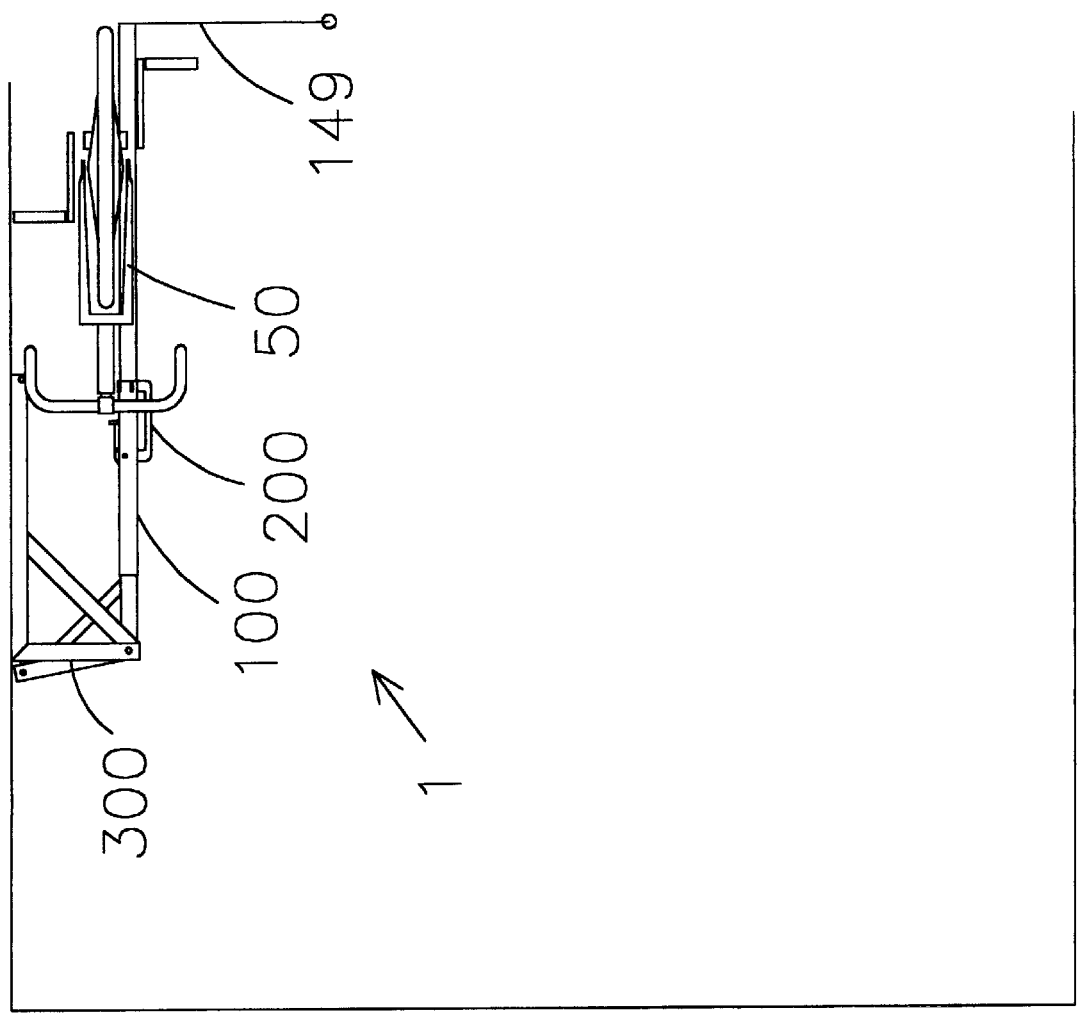

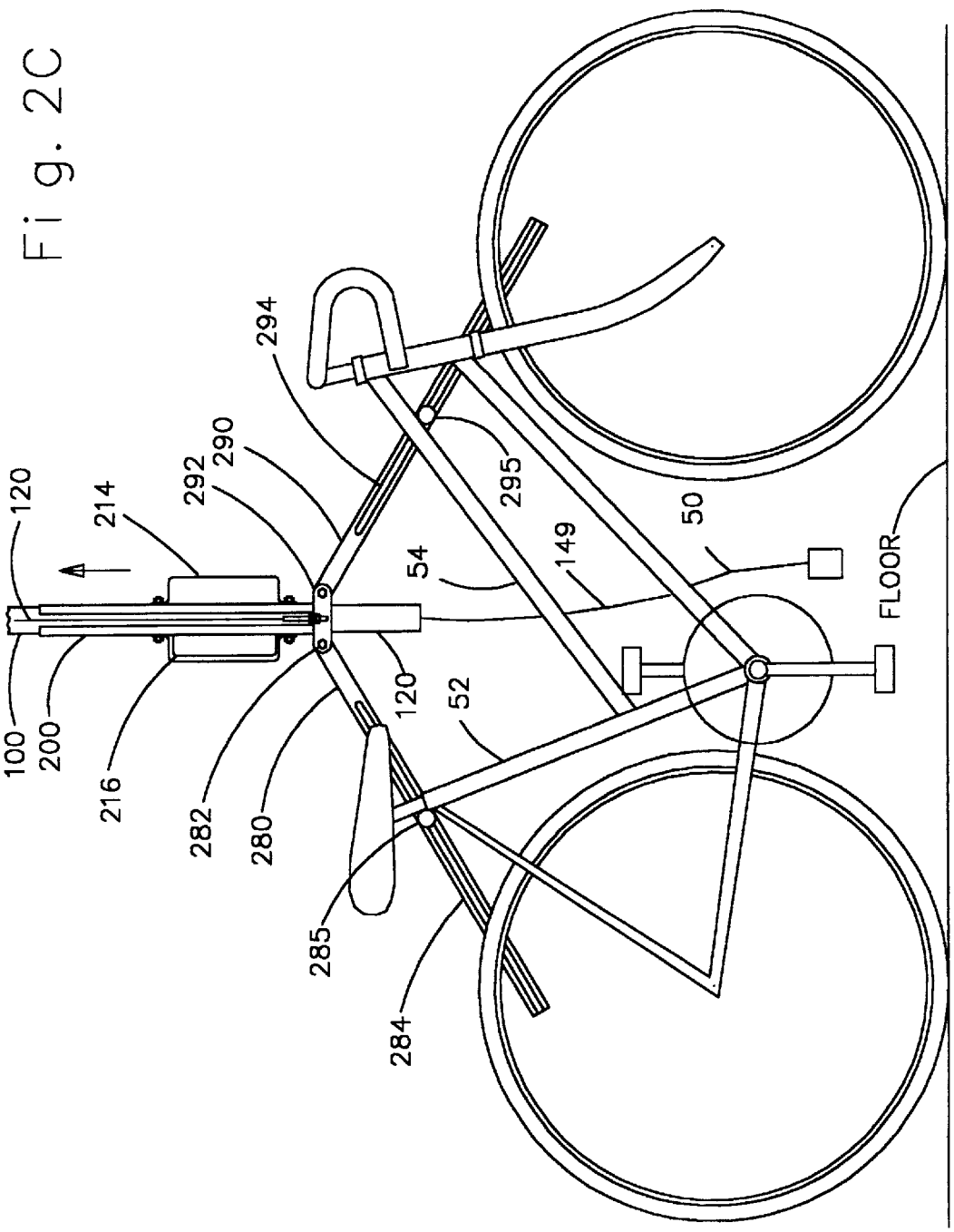

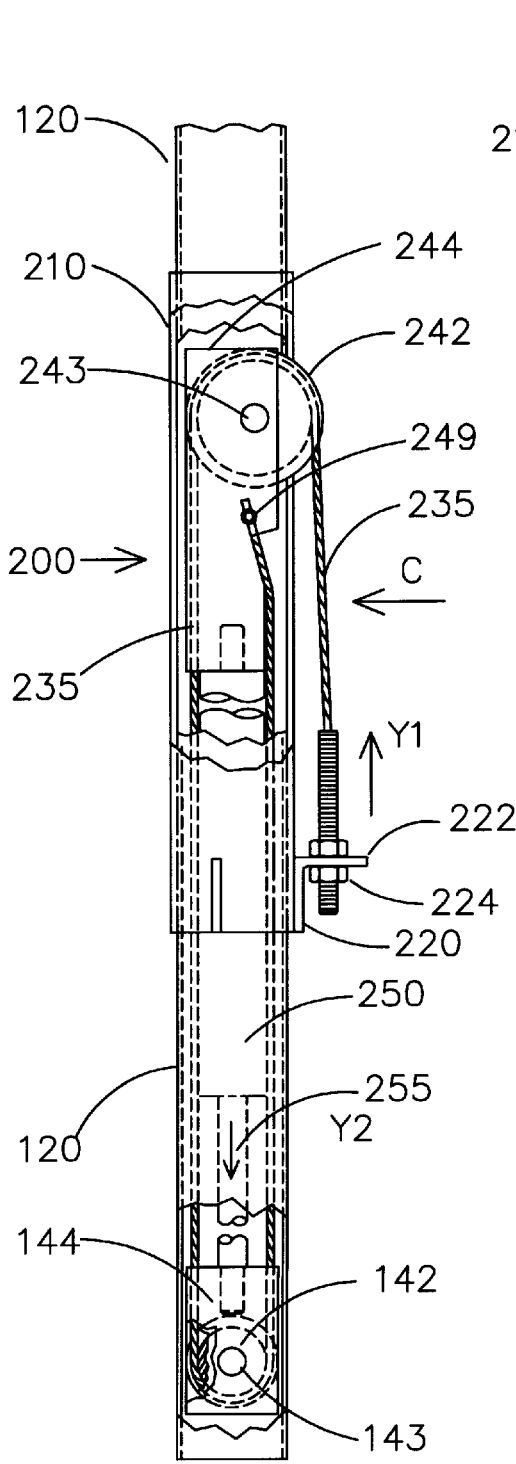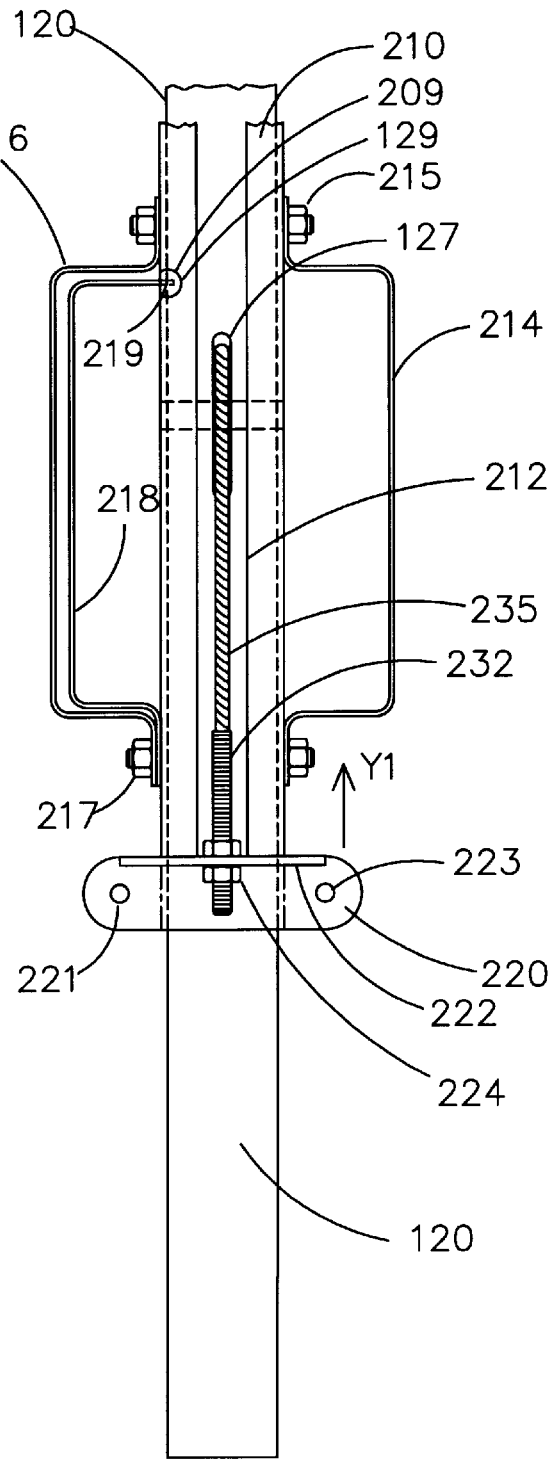

OVERHEAD STORAGE SYSTEM

This invention relates to bicycles, and in particular to a device for lifting forty to fifty pound objects such as bicycles from a vertical standing position to a horizontal position adjacent to a ceiling for storage.

BACKGROUND AND PRIOR ART

Bicycles have had a growing popularity in recent years. When not used bicycles take up valuable floor surface storage space. Bicycles left standing over a long period of time have additional problems such as the rubber tires tend to flatten out over time. Furthermore, these floor standing bicycles can become hazards to persons trying to maneuver about them.

Proposed solutions have been made over the years to store bicycles. For example, hooks with screwable ends have been used to allow the bicycles to be suspended by their wheel rims from ceilings. See for example: U.S. Pat. No. 5,460,274 to Kramer. Similarly, overhead ceiling attached racks also rely on suspending bicycles by their wheel rims. See U.S. Pat. No. 1,232,501 to Colen. A main problem with these hook/rack systems is that the user has to physically lift the bicycle above their head in order to mount the wheel rims onto the hooks/racks. The natural weight of the bicycle itself is a problem to both lift and maneuver. Furthermore, some high ceilings would make it near impossible to both mount the hooks/racks, and maneuver the bicycle wheel rims onto the hooks/racks. Still furthermore, some bicycles with "quick release" wheels have resulted in the bicycle disengaging from the wheel itself. Still furthermore, some light alloy weight bicycle wheel rims are not strong enough to support the weight of the entire bicycle.

Other proposed solutions have incorporated mechanical pulleys and winches. See for example U.S. Pat. No. 5,354,035 to Helgren; and U.S. Pat. No. 5,474,189 to Peterson. However, both systems generally rely on the user pulling a cord and/or using a spring loaded arm to lift the bicycle. The user would be restricted to certain weight limitations on the bicycles by both methods. And the user has to still physically lift and/or lower the weight of the bicycle in these systems.

Still other proposed solutions have relied on wall and ceiling mounted tracks. See U.S. Pat. No. 3,770,133 to Kolker; and U.S. Pat. No. 5,183,162 to Ritzenthaler. However, these devices generally need electrically driven garage-door type motors that require costly electrical power to operate. These track mounted devices take up valuable wall storage space. Furthermore, the wall and ceiling track systems require extensive wall and ceiling assembly and set-up, and would appear to be expensive to manufacture, and sell, making these devices undesirable to average users.

Thus, the need exists for a solution to the above problems.

SUMMARY OF THE INVENTION

The first objective of the present invention is to provide an overhead storage device for bicycles in which the user does not have to physically raise or lower the weight of the bicycle.

The second object of this invention is to provide an overhead storage device for bicycles that can be easy to mount on a ceiling.

The third object of the present invention is to provide an overhead storage device for bicycles which does not require an outside power supply such as an electric motor.

The fourth object of this invention is to provide an overhead storage device for bicycles that raises the bicycle from a vertical ground based position to a horizontal position adjacent to a ceiling.

The fifth object of this invention is to provide an overhead storage device for bicycles that does not require wall mounts and thus does not take up wall space.

The sixth object of this invention is to provide an overhead storage device for bicycles that does not lift the bicycle by their rim(s).

A preferred embodiment of the overhead storage lifting device for a bicycle includes a longitudinal boom having an upper end and a lower end, a support means on the lower end of the boom for supporting a bicycle frame, a mount attached to a ceiling and connected to the upper end of the boom, and an upper gas spring cylinder which causes the boom to pivot about the ceiling mount and raise the bicycle from a vertical standing position to a horizontal storage position adjacent to the ceiling. The boom can have a slidable support having an extended position where both wheels of the bicycle are adjacent to a floor, and a retracted position where both the bicycles wheels are vertically raised above the floor and locked in place by a latch. A second gas spring cylinder can be used to move the slidable support from the retracted position to the vertically raised position. The vertically raised raised position can be approximately one to approximately three feet above the floor. Pegs, which can be variably positioned on arms on the slidable support hold the frame of the bicycle. A pull cord is used to move the boom from the horizontal storage position to the vertical standing position.

Further objects and advantages of this invention will be apparent from the following detailed description of a presently preferred embodiment which is illustrated schematically in the accompanying drawings.

BRIEF DESCRIPTION OF THE FIGURES

FIG. 1A is a side view of the overhead storage system with a boom in a down bicycle load position.

FIG. 1C is a side view of FIG. 1A with the boom starting to rise.

FIG. 1D is a side view of FIG. 1A with the boom in a horizontal storage position

FIG. 2C is an enlarged view of the load position of the boom and bicycle of FIG. 2A.

FIG. 5A is an enlarged cross-sectional view of the lower gas spring and lower boom of the overhead storage system of the preceding figures.

FIG. 5B is a view of the lower gas spring and lower boom of FIG. 5A along arrow C.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
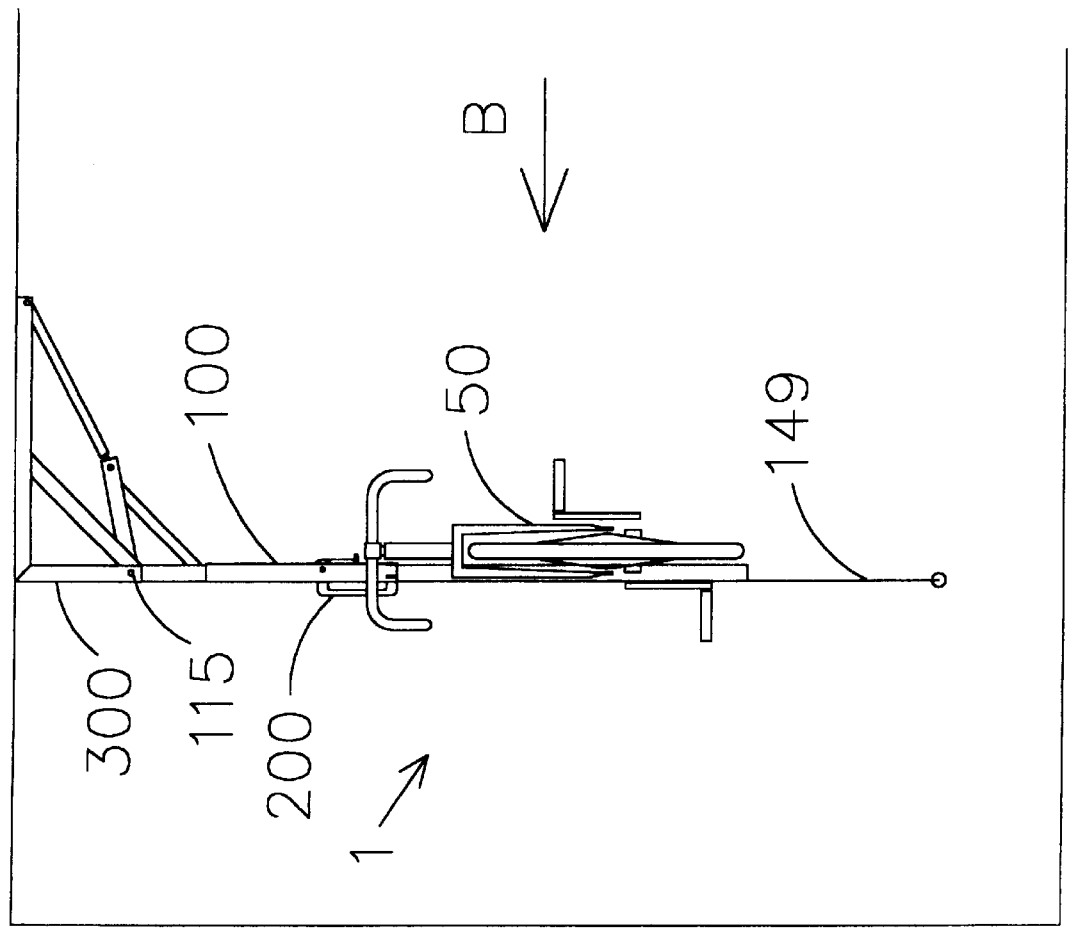
FIG. 1B is a side view of the storage system of FIG. 1A with the boom in a slide up position.

FIG. 1A is a side view of the overhead storage system 1 in a down bicycle load position. FIG. 1B is a side view of the storage system 1 of FIG. 1A in a slide up position. FIG. 1C is a side view of FIG. 1A with the boom starting to rise. FIG. 1D is a side view of FIG. 1A with the boom in a horizontal storage position.

Referring to FIGS. 1A–1C, overhead storage system 1 includes a bicycle 50 supported by arms 280, 290 (FIG. 2C) connected to a telescoping tubular slide assembly 200 which can be raised and lowered relative to the longitudinal member 120 of boom 100. The boom 100 can pivot in a ceiling mount bracket 300 from a vertical position to a horizontal position. Boom 100 has upper horizontal bar 110, pivot point 115, and longitudinal section having longitudinal member 120 and telescoping tubular slide 200. The user-operator pulls the stored bicycle 50 down with a cord 149 similar in ease to pulling down a set of attic type stairs starting from step 4 FIG. 1D, then step 3 FIG. 1C, to Step 2 FIG. 1B. The user-operator can lower the bicycle further to step 1 FIG. 1A using the handles 214, 216 on slide assembly 200 in the direction of arrow Y2 as shown and described in reference to FIGS. 2A–2C, 5A and 5B. Reversing the process allows the bicycle 50 to go from FIG. 1A to FIG. 1B, to FIG. 1C to FIG. 1D.

Figure 2A:
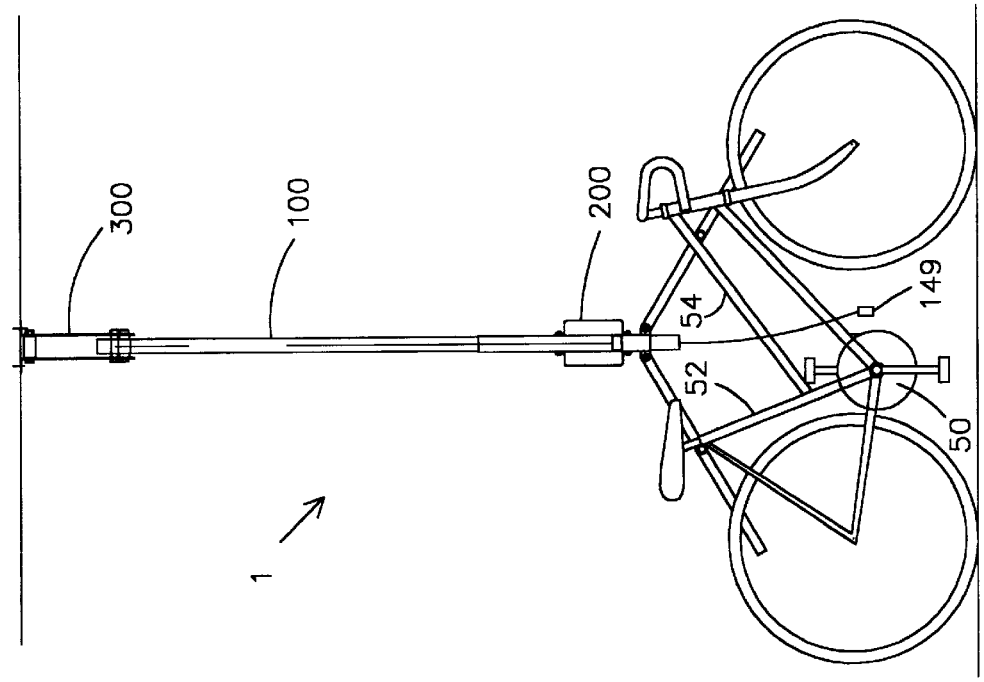
FIG. 2A is a front view of the load position of FIG. 1A along arrow A.
Figure 2B:
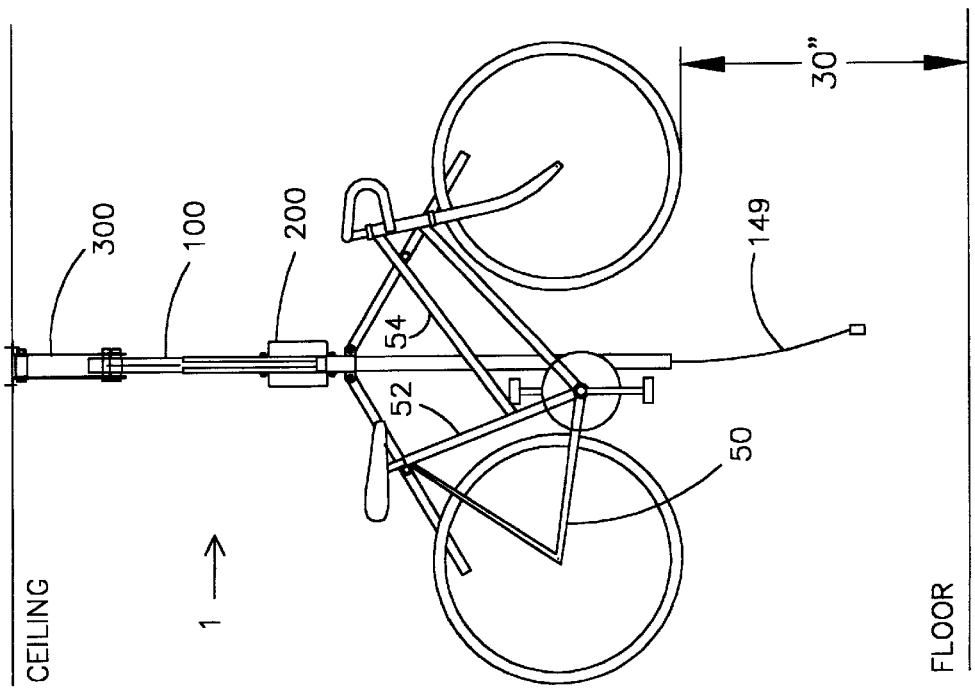
FIG. 2B is a front view of the slide-up position of FIG. 1B along arrow B.

FIG. 2A is a front view of the load position of FIG. 1A along arrow A. FIG. 2B is a front view of the slide-up position of FIG. 1B along arrow B. FIG. 2C is an enlarged view of the load position of the boom and bicycle of FIG. 2A.

Referring to FIGS. 2A–2C, a bicycle 50 having angled supports 52, 54, which can rest on pegs 285, 295 that are screwed into open channels 284, 294 of support arms 280, 290, the latter of which are attached to and hang downwardly at an angle of approximately forty-five degrees to the lower boom member 120. Pegs 285 and 295 can be adjustably positioned in different locations of their respective channels 284, 294.

Figure 3D:
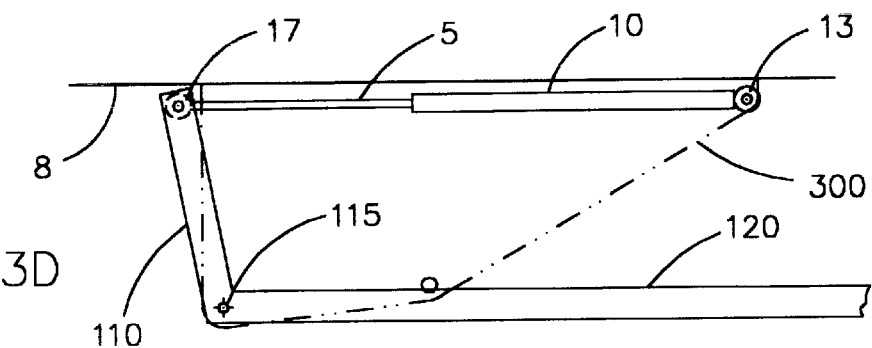
FIG. 3D is a view of the upper gas spring and boom of FIG. 3A with the boom in a horizontal bicycle storage position.
Figure 3C:
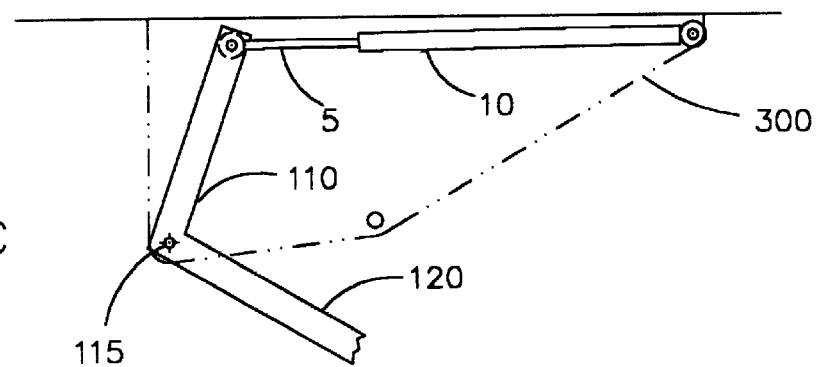
FIG. 3C is a view of the upper gas spring and boom of FIG. 3A with boom raised to a thirty degree of rotation position.
Figure 3B:
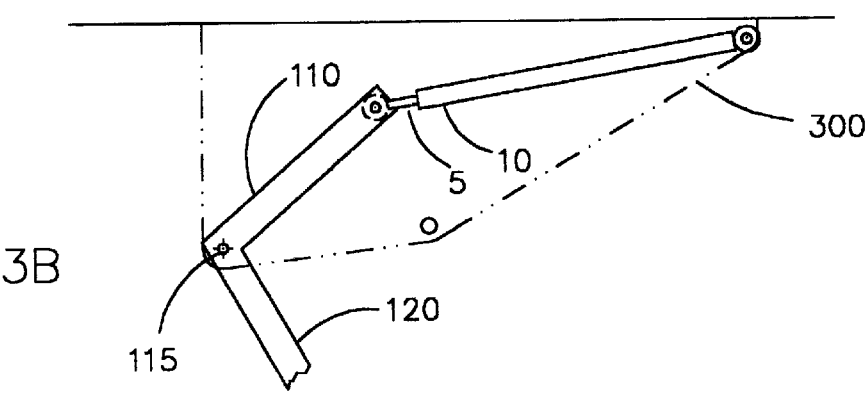
FIG. 3B is a view of the upper gas spring and boom of FIG. 3A with boom raised to a sixty degree of rotation position.
Figure 3A:
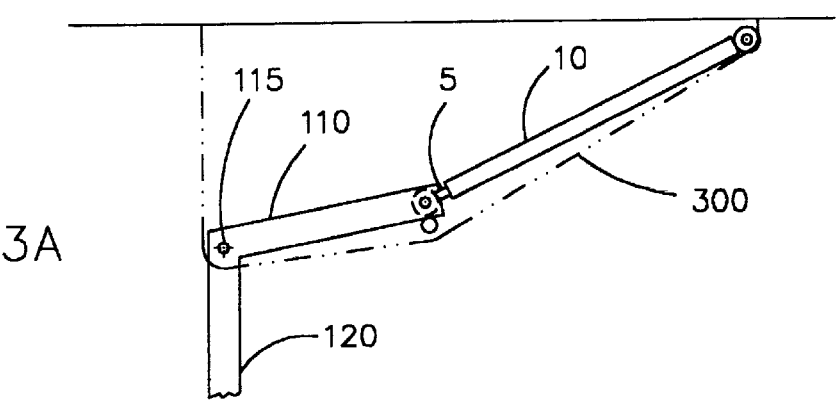
FIG. 3A is an enlarged side view of the upper gas spring and boom of the overhead storage system of the preceding figures in a downward load position, with the boom ninety degrees to the ceiling.
Figure 4:
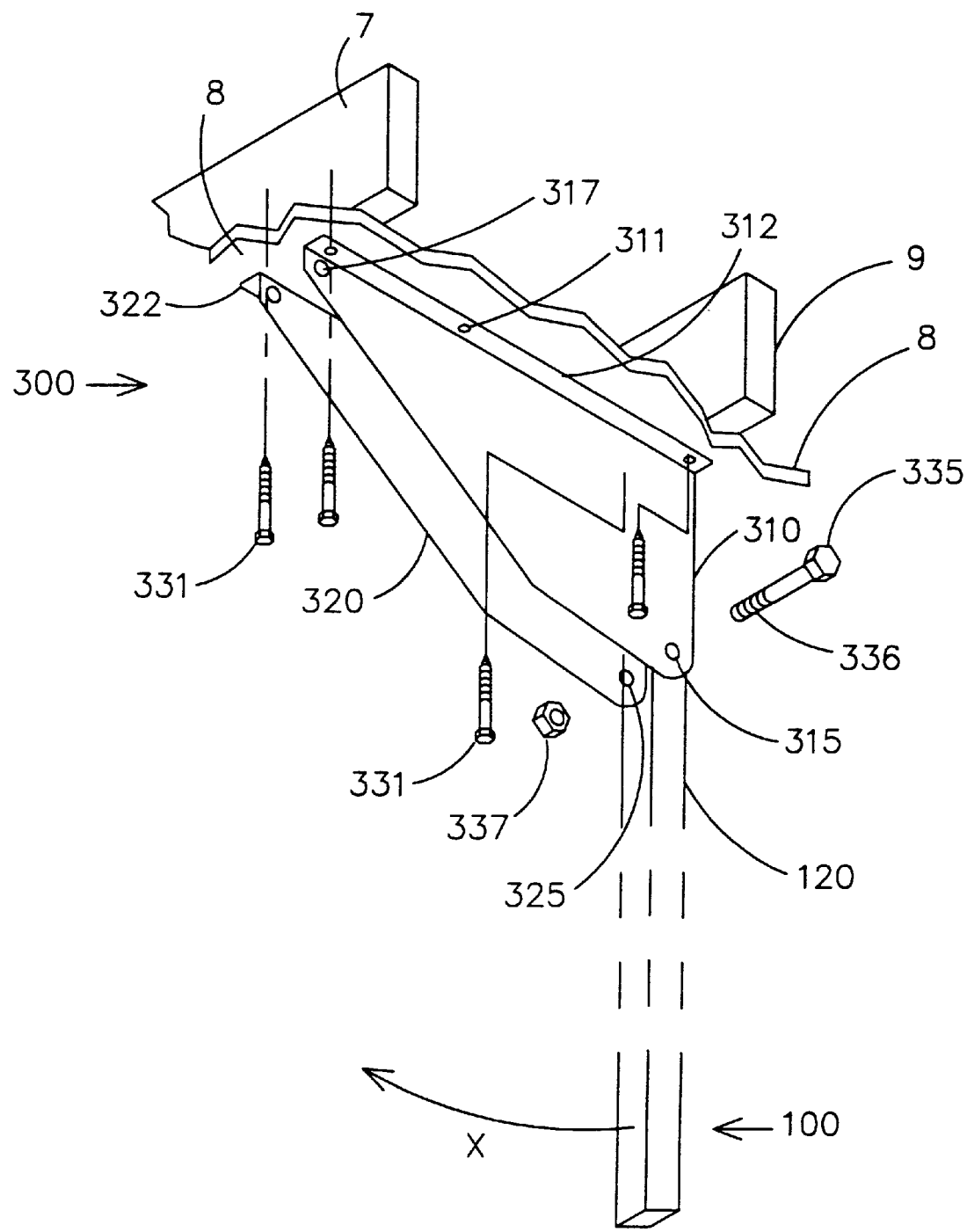
FIG. 4 is an exploded view of the ceiling bracket and boom pivot connections of the overhead storage system shown in the proceeding figures.

FIG. 3A is an enlarged side view of the upper gas spring 10 and longitudinal member 120 of the overhead storage system 1 of the preceding figures in a downward load position, with the longitudinal member 120 of boom 100 ninety degrees to the ceiling. FIG. 3B is a view of the upper gas spring 10 and longitudinal member 120 of FIG. 3A raised to a sixty degree of rotation position. FIG. 3C is a view of the upper gas spring 10 and longitudinal member 100 of FIG. 3A with longitudinal member 120 raised to a thirty degree of rotation position. FIG. 3D is a view of the upper gas spring 10 and longitudinal member 100 of FIG. 3A with the boom member 120 in a horizontal bicycle storage position. FIG. 4 is an exploded view of the ceiling bracket 300 and boom pivot connections of the overhead storage system shown in the proceeding figures. Upper gas spring 10 can be an approximately 200 lb force nitrogen gas spring cylinder normally with the piston 5 biased inside the gas spring 10.

Referring to FIGS. 3A–3D and 4, ceiling bracket 300 includes two opposing substantially triangular plates 310 and 320 having perpendicular bent flange portions 312, 322 with fasteners such as lag bolts passing through holes 311(only one is shown) in the flange portions 312, 322 and fastened into the drywall 8 and into rafters/joists 7, 9 within a ceiling. A pivot pin 335 passes into a through-hole 315 of right plate 310 and into a through-hole 115 at the crook between longitudinal member 120 and upper angled boom member 110, and into the matching through-hole 325 of left plate 320 having a threaded portion 336 connected to a screw on nut 337. A pivot connection 13 attached to an end of an upper gas spring cylinder 10 and has an inwardly directed biased piston 15 with an opposite end 17 pivotally connected to the upper angled boom member 110 of boom 100. Pin 335 allows boom 100 to move in an arc in the direction of arrow X and pivot about pin 335.

FIG. 5A is an enlarged cross-sectional view of the lower gas spring 250 and boom 100 of the overhead storage system 1 of the preceding figures. FIG. 5B is a view of the lower gas spring 250 and tubular member 120 of FIG. 5A along arrow C. Referring to FIGS. 5A–5B, boom 100 includes tubular member 120, a telescoping sliding tube assembly 200 which moves up in the direction of arrow Y1 while lower cylinder 250 moves downward about piston 255 (as seen in FIG. 5A) where the piston rod 255 is a fifteen inch stroke, so that the cylinder 250 moves and travels downward approximately 30 inches. Lower cylinder 250 and piston 255 can be an approximately 80 to approximately 100 lb force nitrogen gas spring cylinder, with the piston 255 normally biased inside cylinder 250. The compound action of the pulley/cable arrangement inside the boom delivers a useable force to lift the bicycle of one half of the nitrogen spring force or about 40 to 50 lbs.

Referring to FIGS. 5A–5B, telescoping tubular slide assembly 200 includes a hollow cylinder sleeve 210 which moves up and down about longitudinal tubular member 120. Sleeve 210 has an open U-shaped back 212 and opposing rectangular handles 214, 216 attached to the outer sides of sleeve 210 by screw and bolt fasteners 215, 217, respectively. A bent latch lever 218 having one end connected by a bolt fastener 217 to sleeve 210 has an opposite bent tip end 219 which fits within a through-holes 209, 129 which is in both the sleeve 210 and in the outer wall of tubular member 120, respectively. Side plate 220 connects across the lower portion of the U-shaped back opening 212, with a perpendicular plate 222 with a fixed nut 224, having a threaded rod 232 fixed to the end of a cable 235 which passes through a through-hole 127 in the back of tubular member 120. Cable 235 passes around an upper pulley 242 having an axle 243 attached to a clevis 244 which is stationary and fixed to the interior of tubular member 120 by axle 243. Stationary clevis 244 provides an anchor mounting for the non-rod end of gas spring 250. Cable 235 passes down the interior of tubular member 120 and passes around a lower pulley 142 having an axle 143 attached to a clevis 144 attached to the cylinder rod 255 of gas spring 250 and moves up and down with the cylinder rod movement inside 120. Cable 235 connects to anchor 249 which is connected to clevis 244. The user grabs the handles 214, 216 to move up the tubular slide assembly 200 in the direction of arrow Y1 until tip end 219 passes into through-holes 209 and 129 locking the position of slider assembly 200 relative to tubular member 120. Gripping handles 214, 216 and moving assembly 200 in the direction of arrow Y2 (FIGS. 5A–5B) slides assembly 200 to a down position as more clearly shown in FIGS. 1A, 2A, and 2C.

The entire storage system can be constructed to only take up a ceiling storage space of approximately 5'6" by 5'6" which includes a bicycle.

Although the preferred embodiment is primarily directed towards storing a bicycle, other objects that weigh approximately 40 to 50 pounds can be stored, such as but not limited to tables, tires and the like, surfboard, fishing gear, sports equipment, wheel chairs, and the like.

The springs can be adjustable with bleeder valves and the like to lift different size weight loads.

Furthermore, larger and smaller springs can be used. For example, larger springs can be used to lift two or more bicycles simultaneously.

Although the preferred embodiment refers to gas spring cylinders, the spring means can include other types of biased springs. Furthermore, electric motors such as those described in the prior art can be used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An overhead storage lifting device for raising and lowering loads, comprising in combination:

a bracket mounted to a ceiling;

a single boom member having an upper portion and a lower portion, the single boom member being substantially L-shaped with the upper portion being substantially perpendicular to the lower portion and having a midportion therebetween, the midportion being pivotally attached to the bracket;

support means on the lower portion of the boom supporting a frame thereon;

a spring pivotally connected to both the upper portion of the boom member and to the bracket, wherein the spring has an expanded position which causes the upper portion of the boom member to pivot about the bracket and raise the frame from a vertical position to a horizontal storage position adjacent to the ceiling;

a slidable sleeve connected to the lower portion of the boom member, the sleeve having a raised position with the frame raised above a floor and a lowered position with the frame adjacent to the floor, the support means being attached to the sleeve;

a second spring within the lower portion of the boom member, the second spring having an upper end connected to the lower portion of the boom member, and a lower end, the second spring having a compressed position and an expanded position;

an upper pulley being connected to the lower portion of the boom member adjacent to the upper end of the second spring;

a lower pulley being connected to the lower end of the second spring; and a cable having one end fixed to the slidable sleeve, the cable passing over the upper pulley and passing over the lower pulley to a second end attached to the lower portion of the boom member, wherein the expanded position of the second spring allows the slidable sleeve to be in the raised position with the frame being above the floor, and the compressed position of the second spring allows the slidable sleeve to be in the lowered position with the frame adjacent to the floor.

2. An overhead storage lifting device for raising and lowering loads, comprising in combination:

a bracket mounted to a lower surface of a ceiling, the bracket having an upper section and a lower section;

a single boom member having an upper portion and a lower portion, the single boom member being fixed in a substantial L-shape with the upper portion substantially perpendicular to the lower portion at a perpendicular point therebetween, the perpendicular point of the single boom member being pivotally connected to the lower section of the bracket;

a spring having one end pivotally connected to the upper section of the bracket and a second end pivotally connected to the upper portion of the single boom member, the spring having an extended position and a compressed position;

support means on the lower portion of the single boom members for supporting a load thereon, wherein the extended position of the spring has the lower portion of the single boom member substantially horizontal and adjacent to the ceiling with the load in a horizontal position resting adjacent to and beneath the ceiling, and the compressed position of the spring has the lower portion of the single boom member substantially perpendicular to the ceiling with the load in an upright position between the ceiling and a floor;

a slidable sleeve connected to the lower portion of the single boom member, the sleeve having a raised position with the load raised above the floor and a lowered position with the load adjacent to the floor, the support means being attached to the sleeve;

a second spring within the lower portion of the single boom member, the second spring having an upper end connected to the lower portion, and a lower end, the second spring having a compressed position and an expanded position;

an upper pulley being connected to the lower portion of the single boom member adjacent to the upper end of the second spring;

a lower pulley being connected to the lower end of the second spring; and a cable having one end fixed to the slidable sleeve, the cable passing over the upper pulley and passing over the lower pulley to a second end attached to the lower portion of the single boom member, wherein the expanded position of the second spring allows the slidable sleeve to be in the raised position, and the compressed position of the second spring allows the slidable sleeve to be in the lowered position.

3. An overhead storage device for raising and lowering loads, comprising in combination:

a boom member having an upper portion being connected to a ceiling, and a lower portion;

a slidable sleeve connected to the lower portion of the boom member;

a load attached to the sleeve, the sleeve having a raised position with the load raised above a floor and a lowered position with the frame adjacent to the floor;

a spring within the lower portion of the boom member, the spring having an upper end connected to the lower portion of the boom member, and a lower end, the spring having a compressed position and an expanded position;

an upper pulley being connected to the lower portion of the boom member adjacent to the upper end of the second spring;

a lower pulley being connected to the lower end of the spring; and a cable having one end fixed to the slidable sleeve, the cable passing over the upper pulley and passing over the lower pulley to a second end attached to the lower portion of the boom member, wherein the expanded position of the spring allows the slidable sleeve to be in the raised position with the load being above the floor and the compressed position of the spring means allows the slidable sleeve to be in the lowered position with the load adjacent the floor.

\* \* \* \* \*